(12) United States Patent
Narasingarayanapeta et al.

(10) Patent No.: US 12,536,146 B2
(45) Date of Patent: Jan. 27, 2026

(54) MAINTAINING TIMESTAMP PARITY OF OBJECTS WITH ALTERNATE DATA STREAMS DURING TRANSITION PHASE TO SYNCHRONOUS STATE

(71) Applicant: NetApp Inc., San Jose, CA (US)

(72) Inventors: Krishna Murthy Chandraiah setty Narasingarayanapeta, Bangalore (IN); Preetham Kudgi Shenoy, Karnataka (IN)

(73) Assignee: NetApp, Inc., San Jose, CA (US)

( * ) Notice: Subject to any disclaimer, the term of this patent is extended or adjusted under 35 U.S.C. 154(b) by 157 days.

(21) Appl. No.: 17/717,377

(22) Filed: Apr. 11, 2022

(65) Prior Publication Data

US 2022/0237170 A1 Jul. 28, 2022

Related U.S. Application Data

(63) Continuation of application No. 16/804,170, filed on Feb. 28, 2020, now Pat. No. 11,301,450.

(51) Int. Cl.
*G06F 16/23* (2019.01)
*G06F 16/27* (2019.01)

(52) U.S. Cl.
CPC ........ *G06F 16/2322* (2019.01); *G06F 16/273* (2019.01)

(58) Field of Classification Search
CPC .......................... G06F 16/2322; G06F 16/273
See application file for complete search history.

(56) References Cited

U.S. PATENT DOCUMENTS

| | | | |
|---|---|---|---|
| 5,339,435 A * | 8/1994 | Lubkin | G06F 8/71 717/121 |
| 7,406,488 B2 | 7/2008 | Stager et al. | |
| 7,797,582 B1 | 9/2010 | Stager et al. | |
| 7,882,286 B1 | 2/2011 | Natanzon et al. | |
| 8,150,800 B2 * | 4/2012 | Webman | G06F 11/14 714/707 |
| 8,234,468 B1 | 7/2012 | Deshmukh et al. | |
| 8,335,771 B1 | 12/2012 | Natanzon et al. | |
| 8,341,115 B1 | 12/2012 | Natanzon et al. | |
| 8,694,700 B1 | 4/2014 | Natanzon et al. | |
| 11,301,450 B2 | 4/2022 | Narasingarayanapeta et al. | |
| 2003/0217058 A1 * | 11/2003 | Ladan-Mozes | G06F 16/1767 |

(Continued)

*Primary Examiner* — Khanh B Pham
*Assistant Examiner* — Brooks T Hale
(74) *Attorney, Agent, or Firm* — Cooper Legal Group, LLC

(57) ABSTRACT

Techniques are provided for maintaining timestamp parity during a transition replay phase to a synchronous state. During a transition logging phase where metadata operations executed by a primary node are logged into a metadata log and regions modified by data operations executed by the primary node are tracked within a dirty region log, a close stream operation to close a stream associated with a basefile of the primary node is identified. A determination is made as to whether the dirty region log comprises an entry for the stream indicating that a write data operation previously modified the stream. In an example, in response to the dirty region log comprising the entry, an indicator is set to specify that the stream was deleted by the close stream operation. In another example, a modify timestamp of the basefile is logged into the metadata log for subsequent replication to the secondary node.

20 Claims, 15 Drawing Sheets

(56) References Cited

U.S. PATENT DOCUMENTS

| | | | |
|---|---|---|---|
| 2004/0139237 A1* | 7/2004 | Rangan | H04L 49/357 |
| | | | 710/1 |
| 2005/0138383 A1* | 6/2005 | Vainstein | G06F 21/645 |
| | | | 713/178 |
| 2005/0193024 A1 | 9/2005 | Beyer et al. | |
| 2006/0259527 A1* | 11/2006 | Devarakonda | G06F 16/13 |
| | | | 707/999.203 |
| 2008/0082592 A1 | 4/2008 | Ahal et al. | |
| 2008/0147756 A1 | 6/2008 | Stager et al. | |
| 2009/0222498 A1 | 9/2009 | Lu et al. | |
| 2009/0313311 A1 | 12/2009 | Hoffmann et al. | |
| 2010/0191884 A1 | 7/2010 | Holenstein et al. | |
| 2011/0099342 A1 | 4/2011 | Ozdemir et al. | |
| 2011/0238621 A1* | 9/2011 | Agrawal | G06F 16/178 |
| | | | 707/610 |
| 2016/0350391 A1 | 12/2016 | Vijayan et al. | |
| 2017/0060702 A1 | 3/2017 | Dave et al. | |
| 2017/0235805 A1* | 8/2017 | Shetty | G06F 16/178 |
| | | | 707/634 |
| 2017/0235806 A1* | 8/2017 | Livshits | G06F 16/2358 |
| | | | 707/634 |
| 2019/0311049 A1 | 10/2019 | Bhargava M R et al. | |
| 2020/0050687 A1 | 2/2020 | Kaushik et al. | |
| 2021/0081432 A1* | 3/2021 | Grunwald | G06F 16/273 |

\* cited by examiner

MAINTAINING TIMESTAMP PARITY OF OBJECTS WITH ALTERNATE DATA STREAMS DURING TRANSITION PHASE TO SYNCHRONOUS STATE

RELATED APPLICATION

This application claims priority to and is a continuation of U.S. patent application Ser. No. 16/804,170, titled "MAINTAINING TIMESTAMP PARITY OF OBJECTS WITH ALTERNATE DATA STREAMS DURING TRANSITION PHASE TO SYNCHRONOUS STATE" and filed on Feb. 28, 2020, which is incorporated herein by reference.

BACKGROUND

Many storage systems may implement data replication and/or other redundancy data access techniques for data loss protection and non-disruptive client access. For example, a first computing device may be configured to provide clients with primary access to data stored within a first storage device and/or other storage devices. A second computing device may be configured as a backup for the first computing device in the event the first computing device fails. Data may be replicated from the first computing device to the second computing device. In this way, the second computing device can provide clients with access to replicated data in the event the first computing device fails.

One type of replication is asynchronous replication. When the first computing device receives an operation from a client device, the first computing device transmits a replication of the operation to the second computing device for execution. Irrespective of whether the second computing device has executed the replicated operation, the first computing device will transmit an acknowledgment of successful performance of the operation to the client device once the first computing device has executed the operation.

Another type of replication is synchronous replication, which provides a greater level of data protection guarantees. This is because the first computing device does not transmit the acknowledgment until the operation has been executed by the first computing device and the replication operation has been executed or acknowledged by the second computing device. In this way, two copies of data and/or metadata resulting from the operation are maintained before the client receives acknowledgment that the operation was successful.

Unfortunately, the first computing device and the second computing device can fall out of sync due to network transmission errors, computer failures, and/or other issues that will cause data maintained by the first computing device to diverge from replicated data maintained by the second computing device. Thus, the data protection guarantees provided by synchronous replication cannot be provided until storage of the first computing device and the second computing device are brought back into a synchronous replication state. Current resynchronization processes can be very disruptive to clients because client operations will be quiesced (e.g., client I/O operations will be blocked, failed, stopped, or queued for later execution) during various phases of resynchronization. Blocking client I/O can cause applications to time out, experience errors, increase client experienced latency, and disrupt access to data.

DETAILED DESCRIPTION

Figure 1:
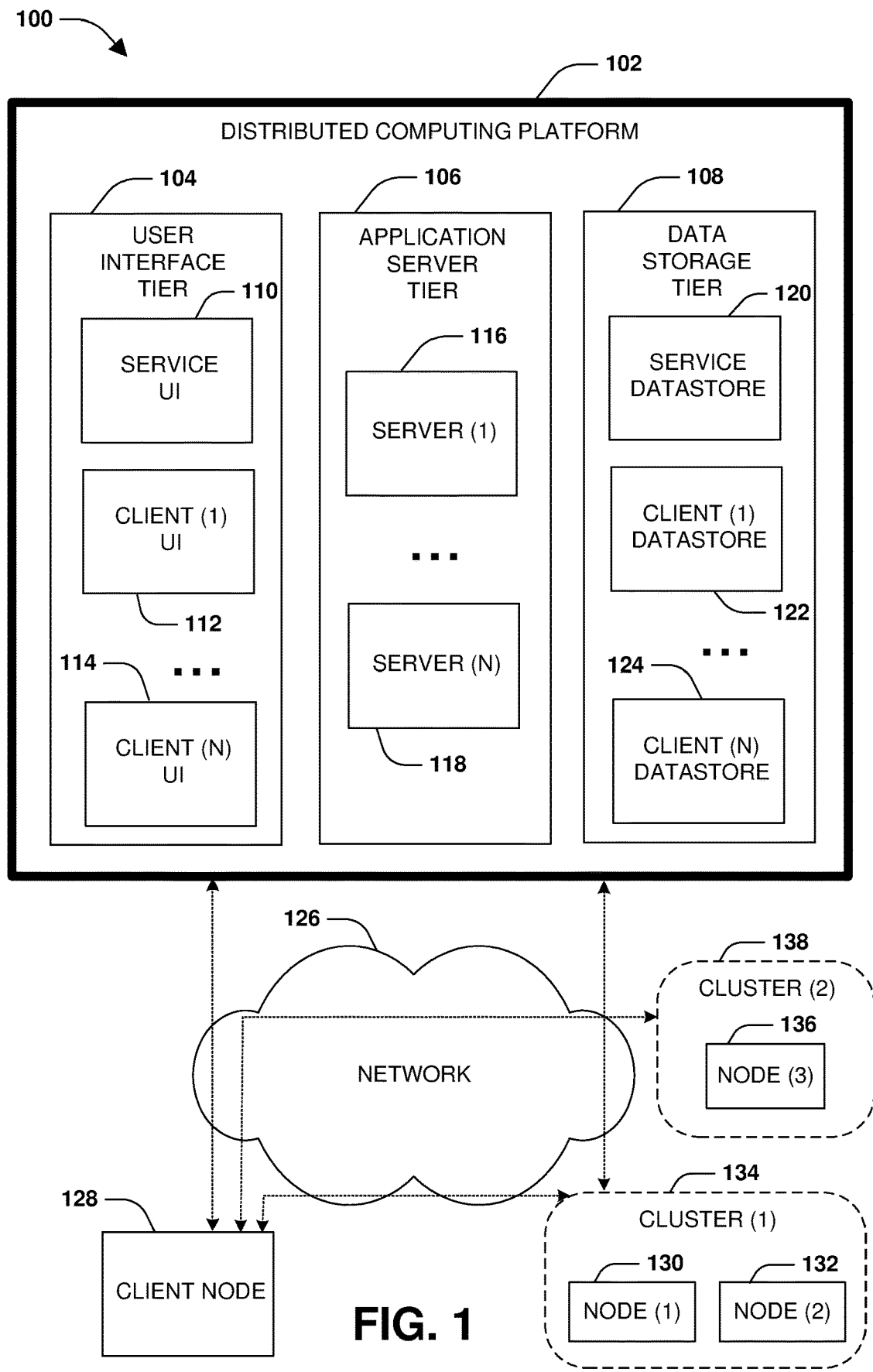
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

In asynchronous replication, incremental changes to a storage object, such as a volume, a file, a directory, a defined set of files or directories, a file system, a basefile, a stream, or a storage virtual machine hosting one or more volumes stored across one or more nodes of a cluster, are replicated from the storage object to a replicated storage object. In synchronous replication, when an operation is received from a client device (e.g., a write operation targeting the storage object), the operation is split to create a replicated operation that is a replica of the operation. The operation is executed upon the storage object, such as by a primary node managing the storage object. The replicated operation is executed upon the replicated storage object, such as by a secondary node managing the replicated storage object. The operation is not acknowledged to the client device as being complete until both the operation and the replicated operation have successfully been executed upon the storage object and the replicated storage object. Synchronous replication and/or asynchronous replication may be implemented by various types of nodes, such as computing devices, servers, virtual machines, hardware, software, computing resources within a cloud computing environment, and/or combinations thereof.

Synchronous replication can be implemented for a new storage object, such as a new volume, in a relatively easy manner. This is because there are no pending client I/O, making real-time changes and modifications to the new volume, which need to be dealt with in order to make a replicated volume of the new volume consistent with the new volume. These pending I/O would otherwise need to be handled so that the new volume and the replicated volume have the same data as a baseline for starting to synchronously replicate new incoming client I/O.

However, for an existing volume that already comprises data that is being actively modified in real-time (e.g., by incoming client I/O), a replicated volume will have to be brought into sync with respect to the existing volume so that the replicated volume has the same data as the existing volume. Because the existing volume is used to actively process client I/O, the replicated volume will lag behind the existing volume due to the client I/O modifying the existing volume. Thus, conventional techniques for transitioning to synchronous replication (e.g., transitioning from a non-synchronous replication state such as an out of sync state or an asynchronous replication state to a synchronous replication state) must pause client I/O (e.g., stop, block, fail, or queue the client I/O for later execution), which increases latency (e.g., increased latency while the client I/O is queued). This also affects the operation of client devices accessing data within the existing volume (e.g., an application may timeout or experience errors when data access operations are blocked or failed).

Accordingly, a transition logging phase and a transition replay phase may be performed to transition a storage object and a replicated storage object from an asynchronous replication state to a synchronous replication state (e.g., an in-sync state) in a manner that mitigates client disruption and latency. In particular, the transition logging phase and the transition replay phase can be performed without holding client I/O (e.g., without pausing, blocking, failing, or queueing for later execution), which reduces client latency that would otherwise be experienced if the client I/O was held during the transition.

During the transition logging phase, a dirty region log is used to track regions within the storage object that are modified by data operations, such as write operations executed during a last asynchronous incremental transfer (e.g., asynchronous incremental transfers may be initially performed to incrementally transfer data from the storage object to a replicated storage object to help make the replicated storage object comprise more of the same data as the storage object). The dirty region log may comprise bits that can be set to either a dirty indicator or a clean indicator. A bit may be mapped to a region within the storage object. Thus, the bit can be set to the dirty indicator to indicate that a data operation has modified the region (e.g., the region now comprises data not yet replicated to the replicated storage object). The bit can be set to the clean indicator to indicate that the region is clean (e.g., the region does not comprise data not yet replicated to the replicated storage object, and thus the region comprises the same data as a corresponding region within the replicated storage object).

In an embodiment, dirty region logs are created as incore dirty region logs (e.g., maintained in memory) for each storage object of a consistency group, such as for each file of the consistency group. Also, incore splitter objects (e.g., functionality configured to intercept and replicate operations) are set up for each replication endpoint (e.g., the replicated storage object hosted by the secondary node) and are set to a dirty region logging state. This ensures that incoming client writes are intercepted by the splitter objects, and for each region that is modified by the incoming client writes, dirty bits are set in the dirty region log. Thus, regions that are dirty are captured incore during the transition logging phase utilizing the dirty region log.

During the transition logging phase, a metadata log is used to track metadata operations executed by the primary node hosting the storage object, such as a create operation (e.g., a create file operation, a create LUN operation, a create basefile operation, a create stream operation, etc.), a link operation, an unlink operation, a rename operation (e.g., a file rename operation, etc.), a set attribute operation (e.g., a set volume size operation, an assign permissions operation, etc.), a close operation (e.g., a close stream operation that closes and deletes a stream associated with a basefile), etc. In particular, copies of metadata operations executed upon the storage object during the last asynchronous transfer are inserted into the metadata log. In an embodiment of tracking metadata operations, the metadata operations are assigned sequence numbers based upon the order that the metadata operations were executed upon the storage object by the primary node. The metadata operations are inserted into the metadata log with the sequence numbers. In an embodiment, the metadata operations are sorted within the metadata log based upon the sequence numbers or are inserted into the metadata log based upon the sequence numbers. If execution of a metadata operation modified a timestamp, such as a change timestamp of a basefile modified by a metadata operation directed to a stream associated with the basefile, then the timestamp is recorded into the metadata log for replication to the secondary node. In an embodiment, merely a single timestamp is recorded within the metadata log for each metadata operation. For example, an operation handler picks up a system timestamp. Logic of the operation handler determines if a change timestamp (ctime) alone or a modify timestamp and change timestamp <mtime, ctime> have to be set to the system timestamp. A synchronous replication component may copy out a timestamp into the metadata log.

Once the last asynchronous transfer is complete, then a transition replay phase is performed to transition the storage object and the replicated storage object to an in-sync state (e.g., transition from a non-synchronous replication state such as an out of sync state or an asynchronous replication state to a synchronous replication state). The transition replay phase comprises a metadata log scan/metadata log replay phase followed by a dirty region log scan/dirty region log replay phase. In an embodiment, a cutover scanner performs the transition replay phase. The cutover scanner may be implemented at the primary node or at any other device or node. During a metadata log scan/replay phase of the transition replay phase, the metadata operations within the metadata log are replicated to the replicated storage object according to an order that the metadata operations were executed upon the storage object in order to maintain consistency. During replay, a timestamp of a metadata operation being replayed from the metadata log is passed to the secondary node. Logic of the operation handler at the secondary node determines if both the modify timestamp and/or the change timestamp has to be modified to a value of the timestamp passed to the secondary node by the primary node.

After the metadata operations are replicated to the secondary node for execution upon the replicated storage object according to the sequence numbers, the dirty regions identified by the dirty region log (e.g., regions having corresponding dirty indicators set for the regions within the dirty region log) are replicated from the storage object to the replicated storage object during a dirty region log scan phase of the transition replay phase. That is, the data within the dirty regions (e.g., "dirty" data not yet replicated to the replicated storage object) is transmitted to the secondary node for storage into corresponding regions within the replicated storage object. The replication of the dirty region is triggered based upon completion of the replication of the metadata operations. That is, metadata operations may be replayed before data of dirty regions is replicated to the secondary node.

During a dirty region log scan phase (sub-phase) of the transition replay phase, the splitter objects are changed to a cut over split state. From this point forward during the dirty region log scan phase, for every incoming client I/O, a corresponding dirty region log for a target storage object is evaluated. If a write operation targets a dirty region of a storage object that is not locked (e.g., the dirty region may be locked from being modified when data of that dirty region is being replicated by the cutover scanner), then the write is executed upon the storage object. If a write operation targets a non-dirty or partially dirty region, then data of the write operation is written to the storage object and is split/ replicated to a replicated storage object (e.g., synchronously replicated to the secondary node).

The cutover scanner may also be executed to read the incore dirty region logs during a dirty region log scan phase. For every dirty region identified, dirty data is replicated to the replicated storage object. During the replication, a lock can be obtained for the dirty region so that any writes to the dirty region are blocked while data of that particular dirty region is being replicated by the cutover scanner during the dirty region log scan phase. The lock is removed once the secondary node writes the replicated dirty data to the replicated storage object. During the dirty region log scan, the modify timestamp and change timestamp are explicitly replicated.

In various situations such as where a write to an NT stream is followed by deletion of the NT stream during the transition logging phase, timestamp mismatch can occur between the primary node and the secondary node after the transition replay phase to an in-sync state, such as to a synchronous replication state between the primary node and the secondary node. This can lead to inconsistencies and other operational issues, such as after a switchover from the primary node to the secondary node occurs in response to the primary node failing. After the switchover, the secondary node is actively providing clients with access to replicated data that could have inconsistent timestamps in relation to timestamps maintained by the failed primary node. In an example of how timestamp mismatch may occur, a primary node may maintain a basefile. The basefile represents main content of a file, such as a Common Internet File System (CIFS) file. One or more streams (e.g., an NT stream) may be associated with the basefile. In an example, a stream may correspond to additional data associate with the basefile. The basefile may have a modify timestamp (mtime) and a change timestamp (ctime). The modify timestamp may correspond to a last time to which the basefile was written. The change timestamp may correspond to a time at which an inode of the basefile was last modified.

Initially, the modify timestamp and the change timestamp of the basefile maintained by the primary node may be set to t0. During the transition logging phase, a write data operation may be received by the primary node. The write data operation may be directed to a stream (e.g., an NT stream) of the basefile. The write data operation may be executed at t1 by the primary node, and thus the modify timestamp is set to t1 and the change timestamp is set to t1. Execution of the write data operation may be tracked using the dirty region log. In particular, a region of storage maintained by the primary node may be marked as dirty by associating a dirty indicator with the region through the dirty region log.

Subsequently, a close stream operation may be received by the primary node. The close stream operation may be a metadata operation whose execution is logged within the metadata log. The close stream operation may be executed at t2 by the primary node. Execution of the close stream operation will close the stream of the basefile. If the stream is an NT stream, then the close stream operation will delete the NT stream, whereas close operations for other types of objects (other types of streams) may not delete the stream being closed. Execution of the close stream operation at t2 will result in the change timestamp of the basefile being set to t2. However, the modify timestamp will remain at t1 because execution of the close stream operation does not affect the modify timestamp, and thus only the change timestamp of t2 will be logged within the metadata log. In an example, the modify timestamp remains at t1 as a result of behavior of the basefile being a CIFS file. In general, any modification to an NT stream results in the modification of timestamps of the basefile since the NT stream is considered an extension of the basefile itself. In the case of an NT stream being deleted by a close stream operation, only the change timestamp of the basefile changes as per the specification of the CIFS protocol. Thus, the modify timestamp, which is left unchanged by execution of the close stream operation, is associated with the basefile. After execution of the write data operation and the close stream operation, the modify timestamp is t1 and the change timestamp is t2.

During the metadata log replay phase of the transition replay phase, the close stream operation is replayed upon a replicated basefile that is maintained by the secondary node as a replica of the basefile maintained by the primary node. In this way, a change timestamp of the replicated basefile will be set to t2 (e.g., the t2 value may be read from the metadata log and applied to the change timestamp of the replicated basefile). However, the modify timestamp of the replicated basefile will remain at t0 because only the change timestamp was recorded within the metadata log since execution of the close stream operation by the primary node merely affected the change timestamp of the basefile maintained by the primary node. This is because the operation is on the stream, but the timestamps are changed on the basefile. Because there may not be a dirty region log for the basefile (e.g., because nothing changed in the basefile data contents), there is no opportunity to fix the basefile data contents during the dirty region log scan phase.

After the metadata log replay phase completes, a dirty region log scan phase is performed to replicate dirty data (e.g., data of the basefile that has been modified during the transition logging phase, which has yet to be replicated to the replicated basefile) from the basefile to the replicated basefile. When a dirty region log scan attempts to read the content of the stream (e.g., the stream may be associated with a dirty region modified by the write data operation) that no longer exists because the close stream operation deleted the stream, the dirty region log induced read will fail. The failure is expected, and thus the dirty region log scan continues to the next storage object. Unfortunately, this leaves the modify timestamp of the replica basefile at t0 instead of t1. Thus, there is a mismatch between the modify timestamp of t1 for the basefile at the primary node and the modify timestamp of t0 for the replica basefile at the secondary node.

Accordingly, as provided herein, timestamp parity may be maintained during the transition replay phase to an in-sync state, such as to a synchronous replication state where incoming operations to the primary node are synchronously replicated to the secondary node. In an embodiment of maintaining timestamp consistency, an indicator, such as a flag, is utilized for timestamp parity. For example, a transition logging phase is performed where metadata operations executed by the primary node are logged into a metadata log and regions modified by data operations executed by the primary node are tracked within a dirty region log. During the transition logging phase, a close stream operation to close a stream associated with a basefile of the primary node may be identified.

In response to identifying the close stream operation, the dirty region log is evaluated to determine whether any write data operations modified the stream of the basefile before the close stream operation closes and deletes the stream. In particular, the dirty region log is evaluated to determine whether the dirty region log comprises an entry for the stream indicating that a write data operation modified the stream (e.g., modified a region of storage associated with the stream) before the close stream operation is executed by the primary node. If the entry exists within the dirty region log, then a determination is made that a prior write data operation modified a change timestamp and a modify timestamp of the basefile associated with the stream. Because the close stream operation deletes the stream and only modifies the change timestamp, only the change timestamp is recorded within the metadata log and a value of the modify timestamp set by the prior write data operation will not be replicated during a subsequent transition replay phase where a dirty region log scan is performed. Accordingly, an indicator, such as a flag, bit, or other indicator (referred to generally herein as an "indicator"), is set to specify that the stream was deleted by the close stream operation.

During the subsequent transition replay phase where a dirty region log scan phase is being performed to replicate the dirty data identified by the dirty region log from the primary node to the secondary node, the indicator for the stream will be encountered. Encountering the indicator will cause the transition to fail and will trigger a restart of the resynchronization. The resynchronization will replicate the modify timestamp of the basefile from the primary node to a replicated basefile maintained by the secondary node as a replica of the basefile. In this way, the modify timestamp of the basefile and a modified timestamp of the replicated basefile will have the same value instead of different values.

In another embodiment of maintaining timestamp consistency, the modify timestamp of the basefile may be recorded into the metadata log during the transition logging phase in response to the primary node executing the close stream operation to close and delete the stream of the basefile (e.g., as opposed to utilizing an indicator to specify that the close stream operation closed the stream that was previously written to by the write data operation). Normally, merely the change timestamp of the basefile would be recorded into the metadata log in response to the close stream operation being executed and logged within the metadata log, because execution of the close stream operation does not change the modify timestamp of the basefile. During replay of the metadata log during the metadata log replay phase of the transition replay phase, the close stream operation, the change timestamp, and the modify timestamp within the metadata log are transmitted to the secondary node to apply to the replicated basefile. In this way, the modify timestamp of the basefile and the modify timestamp of the replicated basefile will have the same value instead of different values because the modify timestamp of the basefile is logged within the metadata log in response to the close stream operation being executed, and the modify timestamp is then applied to the secondary node.

The ability to maintain timestamp parity/consistency between the primary node and secondary node so that a non-disruptive transition from an asynchronous replication state to an in-sync state such as a synchronous replication state will mitigate inconsistencies, such as timestamp inconsistencies, between the primary node and the secondary node. The ability to non-disruptively transition to the synchronous replication state without introducing timestamp inconsistencies provides improved data protection guarantees, such as zero recovery point objective (RPO) support for network attached storage (NAS), common internet file system (CIFS), and NT streams.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
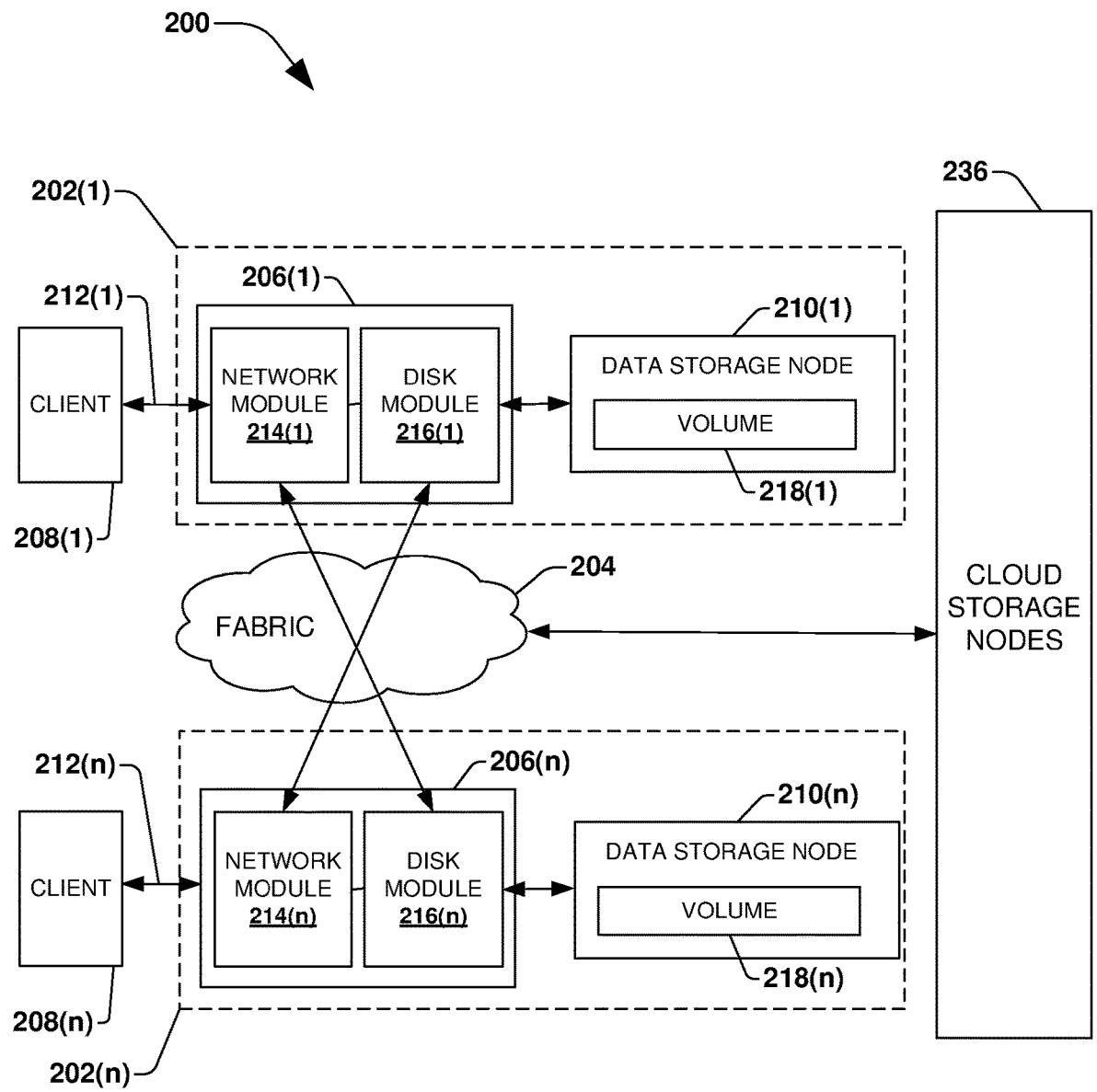
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 106(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
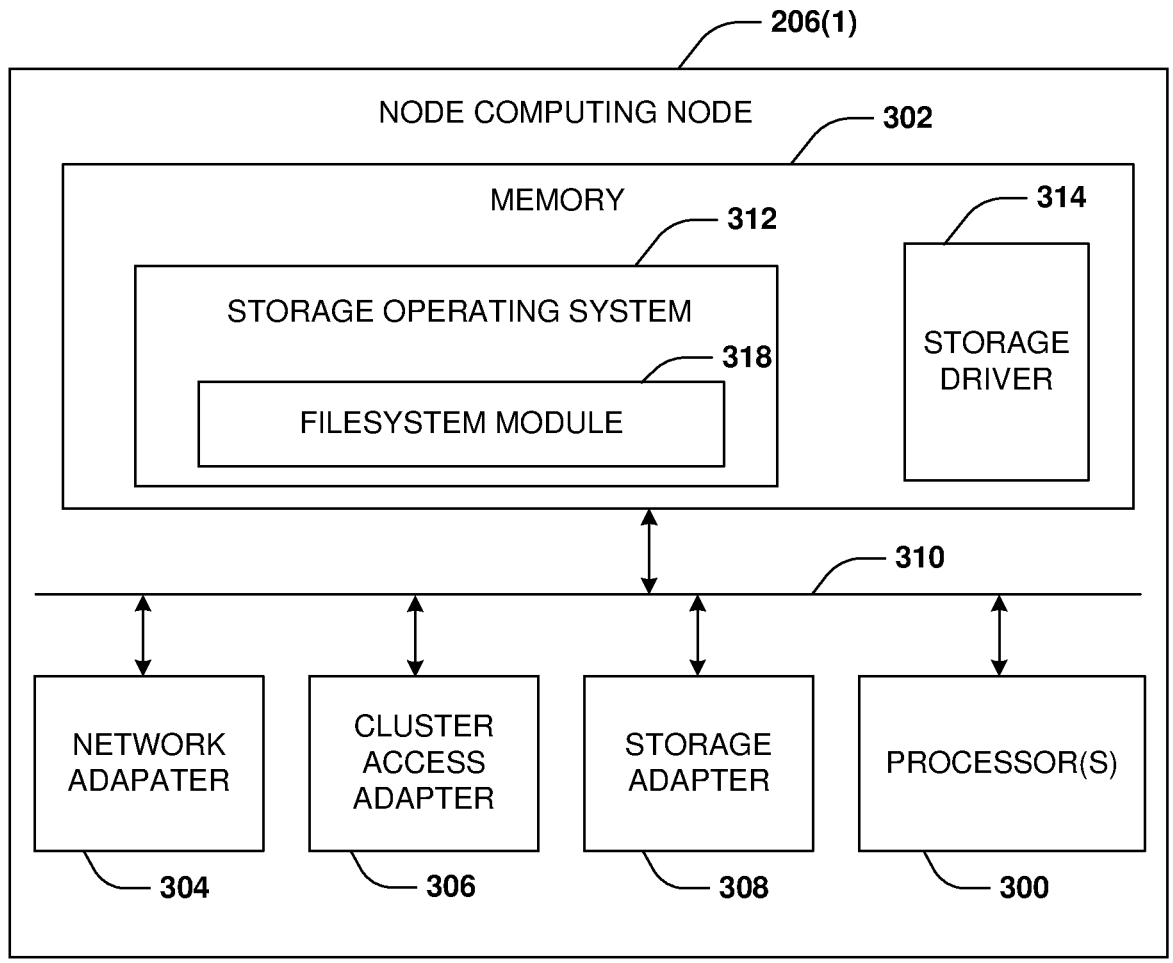
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example maintaining timestamp parity as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
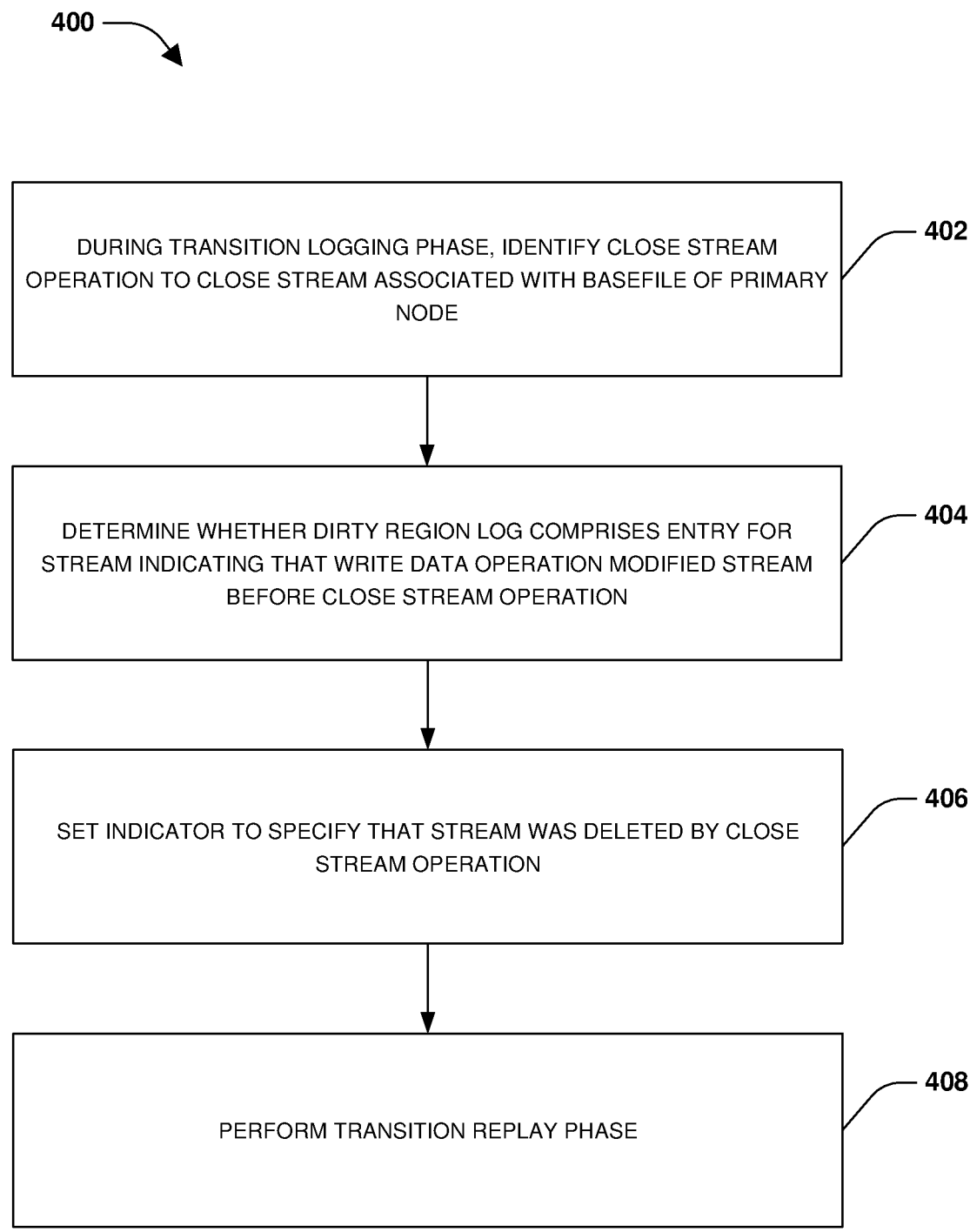
FIG. 4 is a flow chart illustrating an example method for maintaining timestamp parity during a transition replay phase to a synchronous state by utilizing an indicator.

One embodiment of maintaining timestamp parity during a transition replay phase to a synchronous state by utilizing an indicator is illustrated by an exemplary method 400 of FIG. 4 and further described in conjunction with system 500 of FIGS. 5A-5G.

Figure 5A:
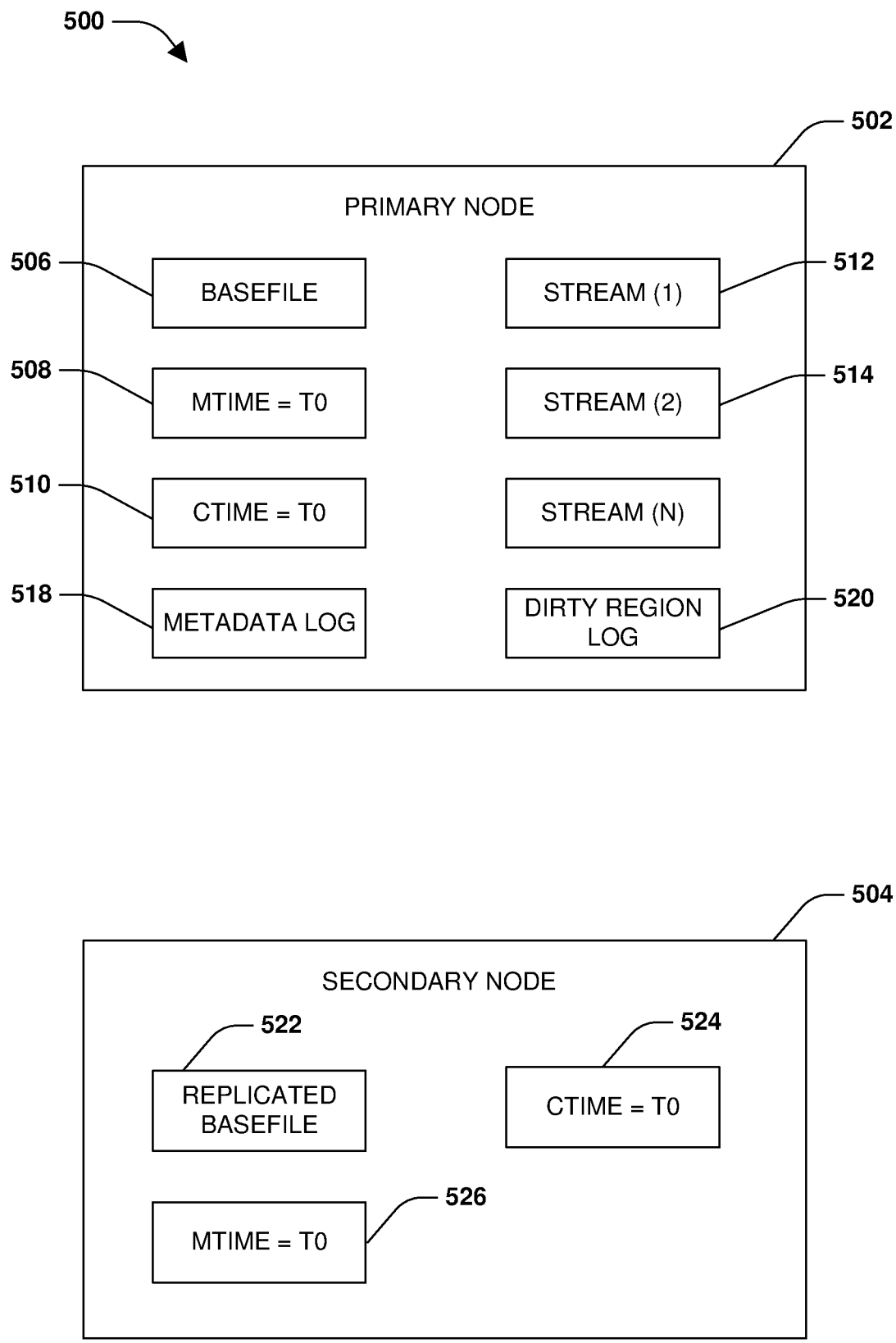
FIG. 5A is a block diagram illustrating an example system for maintaining timestamp parity during a transition replay phase to a synchronous state by utilizing an indicator.

A primary node 502 (e.g., a computing device, a server, a virtual machine, hardware, software, cloud computing resources, or any combination thereof) may maintain one or more basefiles which also have additional data streams, and the basefile and the additional data streams are accessed by a client using the CIFS protocol, as illustrated by FIG. 5A. For example, the primary node 502 may maintain a basefile 506 within which client devices may store and access content through a first stream 512, a second stream 514, and/or any other number of streams (depicted using "stream (N)" in FIGS. 5A-5G). In an embodiment, the basefile 506 represents main content of a CIFS file associated with one or more data streams. The basefile 506 may be associated with a modify timestamp 508. The modify timestamp 508 may correspond to a last time at which the basefile 506 was written to by an operation (e.g., a write data operation to a stream associated with the basefile 506). The basefile 506 may be associated with a change timestamp 510. The change timestamp 510 may correspond to a time at which an inode of the basefile 506 was modified by an operation (e.g., a write data operation to a stream associated with the basefile 506, a close stream operation to close the stream associated with the basefile 506, etc.). Initially, the change timestamp 510 may have a value of t0 and the modify timestamp 508 may have a value of t0, for example.

A secondary node 504 may maintain a replicated basefile 522 that is a replica of the basefile 506. The replicated basefile 522 is associated with a modify timestamp 526 and a change timestamp 524. In order to maintain consistency between the basefile 506 and the replicated basefile 522, the modify timestamp 526 of the replicated basefile 522 should have the same value as the modify timestamp 508 of the basefile 506 and the change timestamp 524 of the replicated basefile 522 should have the same value as the change timestamp 510 of the basefile 506. In this way, if the primary node 502 fails and the secondary node 504 takes over for the failed primary node 502, the secondary node 504 can provide clients, application, and services with access to the same data and metadata such as timestamp metadata as what was previously accessible through the primary node 502 before the failure.

The primary node 502 and the secondary node 504 may be out-of-sync, such as in a non-synchronous replication state (e.g., an asynchronous replication state, a state where no replication is being performed, a semi-synchronous state, etc.), such that operations targeting the basefile 506 and/or streams of the basefile 506 are not being synchronously replicated to the basefile 522 before being acknowledged back as being completed. Accordingly, a transition logging phase and a transition replay phase may be performed to bring the primary node 502 and the secondary node 504 into an in-sync state such as a synchronous replication state.

During the transition logging phase, a dirty region log 520 is used to track regions within a storage object (e.g., regions within a volume within which the basefile 506 is stored) that are modified by data operations executed by the primary node 502. The dirty region log 520 may comprise indicators (e.g., bits in examples discussed herein) that can be set to either a dirty indicator or a clean indicator. A bit may be mapped to a region within the storage object (e.g., a bit may correspond to the basefile 506, a portion of the basefile 506, or the basefile 506 along with other basefiles). Thus, the bit can be set to the dirty indicator to indicate that a data operation has modified the region (e.g., the region now comprises data not yet replicated to a replicated storage object, such as a region of a volume within which the replicated basefile 522 is stored by the secondary node 504). The bit can be set to the clean indicator to indicate that the region is clean (e.g., the region does not comprise data not yet replicated to the replicated storage object, and thus the region comprises the same data as a corresponding region within the replicated storage object, such as where the basefile 506 and the replicated basefile 522 comprise the same data). In an embodiment of utilizing the dirty region log 520 to track dirty data, incore splitter objects are set to a dirty region logging state to ensure incoming write operations are intercepted by the splitter objects, and for each region that is modified by the incoming write operations, dirty bits are set in the dirty region log 520.

Figure 5B:
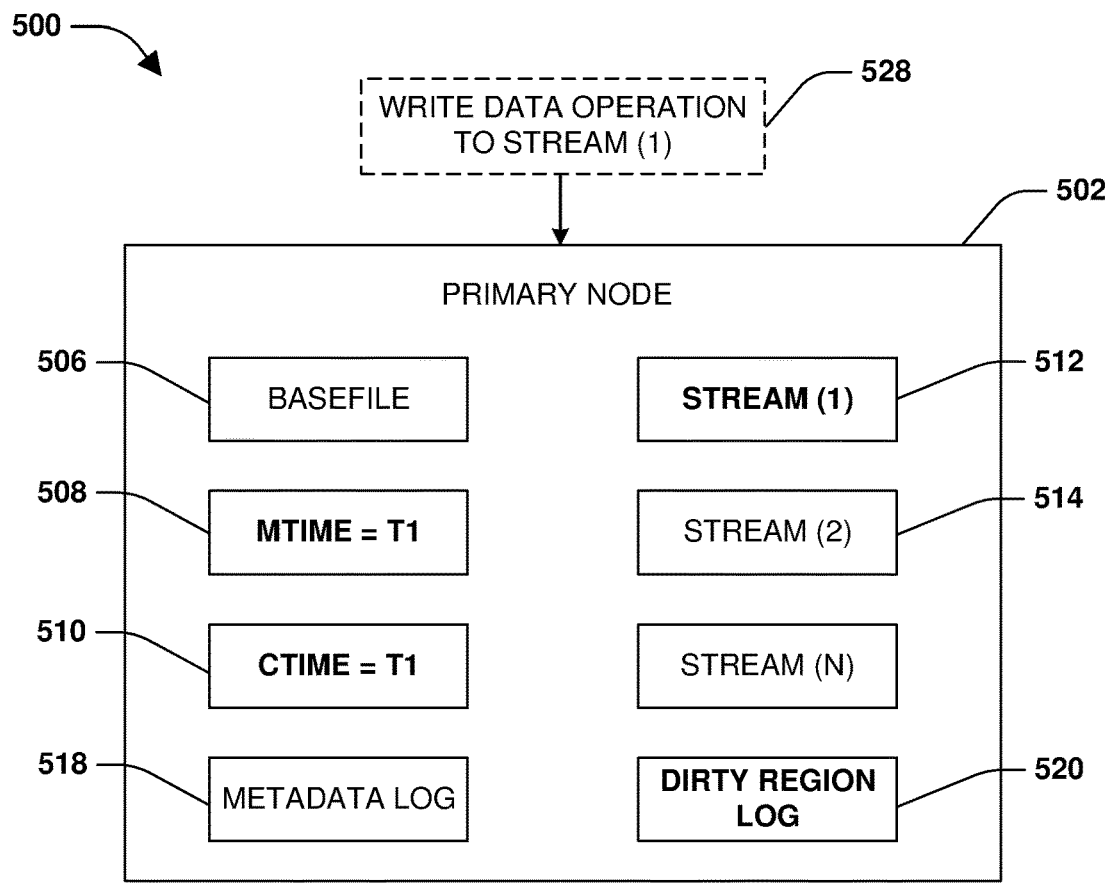
FIG. 5B is a block diagram illustrating an example system for maintaining timestamp parity during a transition replay phase to a synchronous state by utilizing an indicator, where a write data operation is tracked using a dirty region log.
Figure 5B:
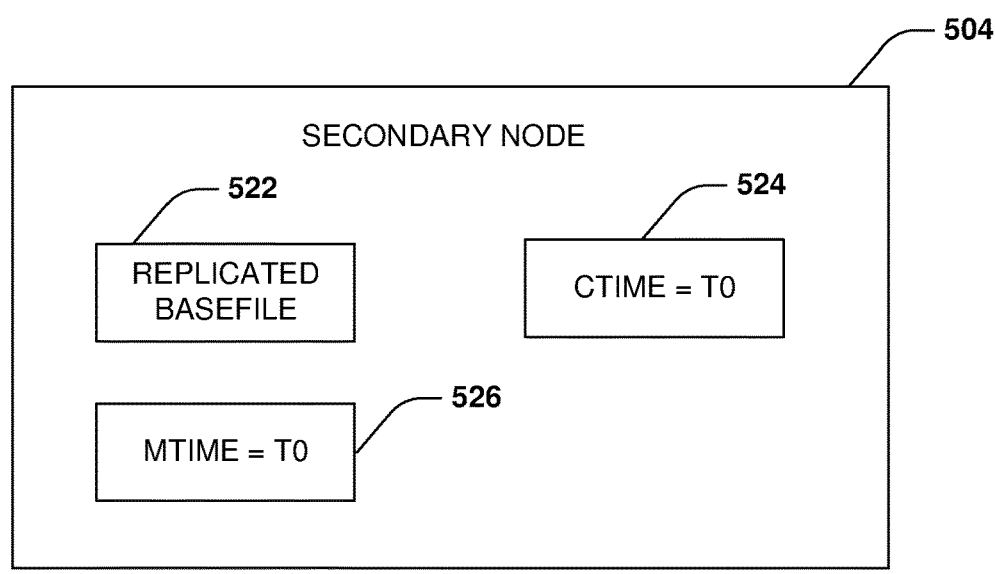

In an embodiment as illustrated by FIG. 5B, the primary node 502 may receive a write data operation 528 targeting the first stream 512 of the basefile 506. The write data operation 528 may be executed by the primary node 502 upon the first stream 512 of the basefile 506, resulting in dirty data within the basefile 506. Accordingly, an entry is created within the dirty region log 520 to indicate that a region within which the basefile 506 is stored has been modified with data not yet replicated to a corresponding region within which the replicated basefile 522 is stored. That is, the entry indicates that the write data operation 528 modified the first stream 512 of the basefile 506 at the region of storage that is now considered dirty. The primary node 502 may execute the write data operation 528 at first time t1. Thus, the value of the modify timestamp 508 is changed from t0 to the first time t1, and the value of the change timestamp 510 is changed from t0 to the first time t1, all in response to the write data operation 528.

During the transition logging phase, a metadata log 518 is also used to track metadata operations executed by the primary node 502, such as a create operation (e.g., a create file operation, a create LUN operation, a create stream operation, a create basefile operation, etc.), a link operation, an unlink operation, a rename operation (e.g., a file rename operation, etc.), a set attribute operation (e.g., a set volume size operation, an assign permissions operation, etc.), a close operation (e.g., a close stream operation that closes and deletes a stream associated with a basefile), etc. For example, a metadata operation and a change timestamp modified by execution of the metadata operation may be logged into the metadata log 518.

Figure 5C:
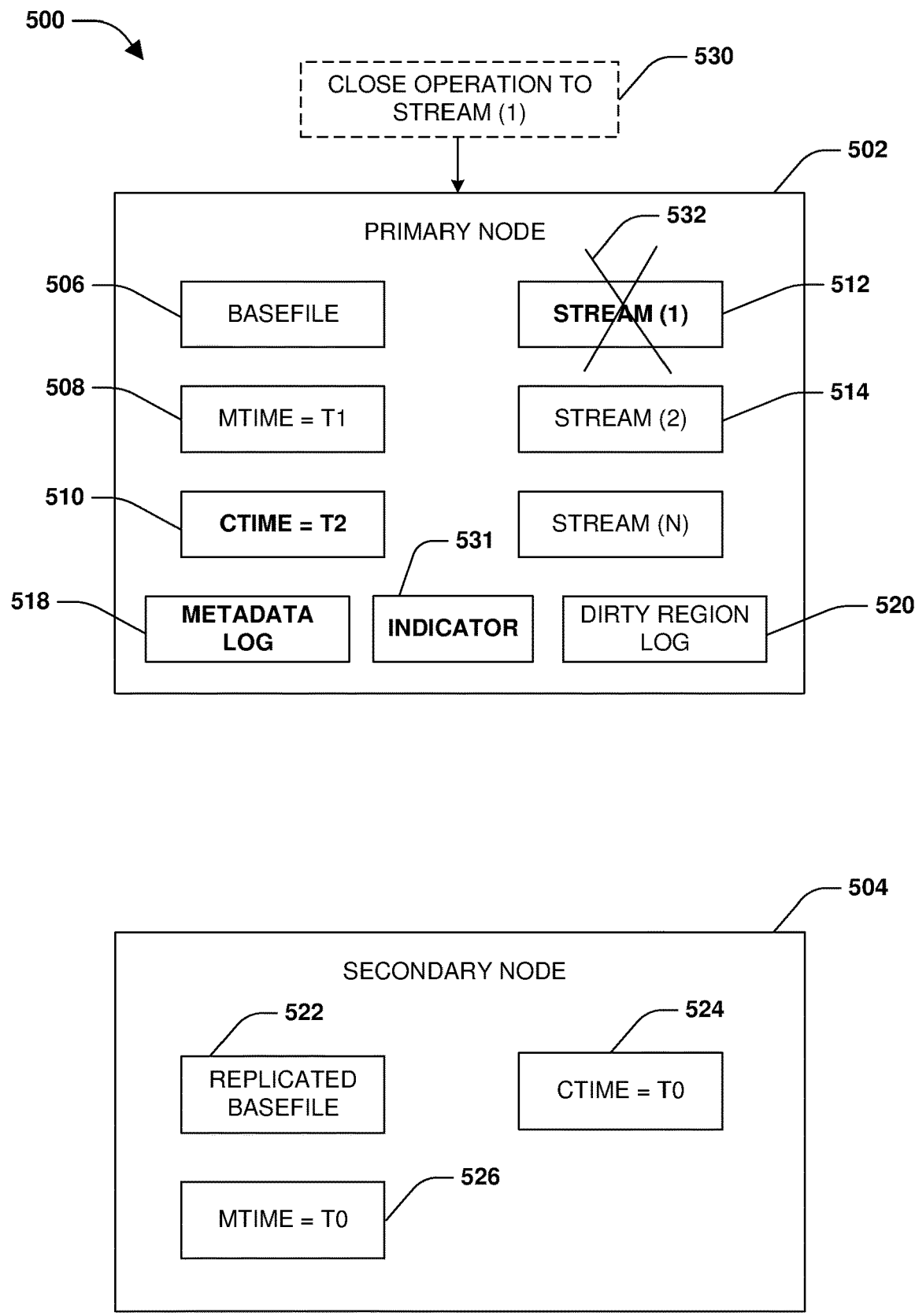
FIG. 5C is a block diagram illustrating an example system for maintaining timestamp parity during a transition replay phase to a synchronous state by utilizing an indicator, where a close stream operation is tracked using a metadata log.

In an embodiment as illustrated by FIG. 5C, the primary node 502 receives a metadata operation, such as a close stream operation 530 to close and delete 532 the first stream 512 of the basefile 506. At 402 (of FIG. 4's exemplary method 400), the close stream operation 530 may be identified as a metadata operation that closes the first stream 512 associated with the basefile 506 of the primary node 502 that could have been modified by one or more previously executed write data operations. The execution of the close stream operation 530 may be performed at a second time t2 subsequent the first time t1 at which the write data operation 528 was executed by the primary node 502. Because execution of the close stream operation 530 affects the change timestamp 510 but does not change the modify timestamp 508 of the basefile 506, the change timestamp 510 is set to the second time t2 and the modify timestamp 508 remains at the first time t1. Accordingly, the close stream operation 530 and the change timestamp 510 of the second time t2 are recorded into the metadata log 518.

At 404, a determination is made as to whether the dirty region log 520 comprises an entry for the first stream 512 indicating that a write data operation modified the first stream 512 before the close stream operation 530 closed and deleted 532 the first stream 512. The determination will result in the identification of the entry for the first stream 512 indicating that the write data operation 528 modified the first stream 512 before the close stream operation 530 is executed.

At 406, in response to identifying the entry within the dirty region log 520 for the first stream 512 modified by the write data operation 528, an indicator 531, such as a flag, a bit, or any other type of indicator, is set to specify that the first stream 512 was deleted 532 by the close stream operation 530 (e.g., an indicator may be created, an existing indicator may be set to a first value such as 1, etc.). The indicator 531 may be stored within the dirty region log 520 or may be stored separate from the dirty region log 520. In an embodiment, the indicator 531 may comprise a flag indicating that the first stream 512 is an NT stream associated with a CIFS file. If the dirty region log 520 did not comprise any entries for the first stream 512, then the indicator 531 may not be created or an existing indicator may not be set to specify that the first stream 512 was deleted 532 by the close stream operation 530 (e.g., no indicator may be created, the indicator may be set to or retained at a second value such as 0, etc.).

Figure 5D:
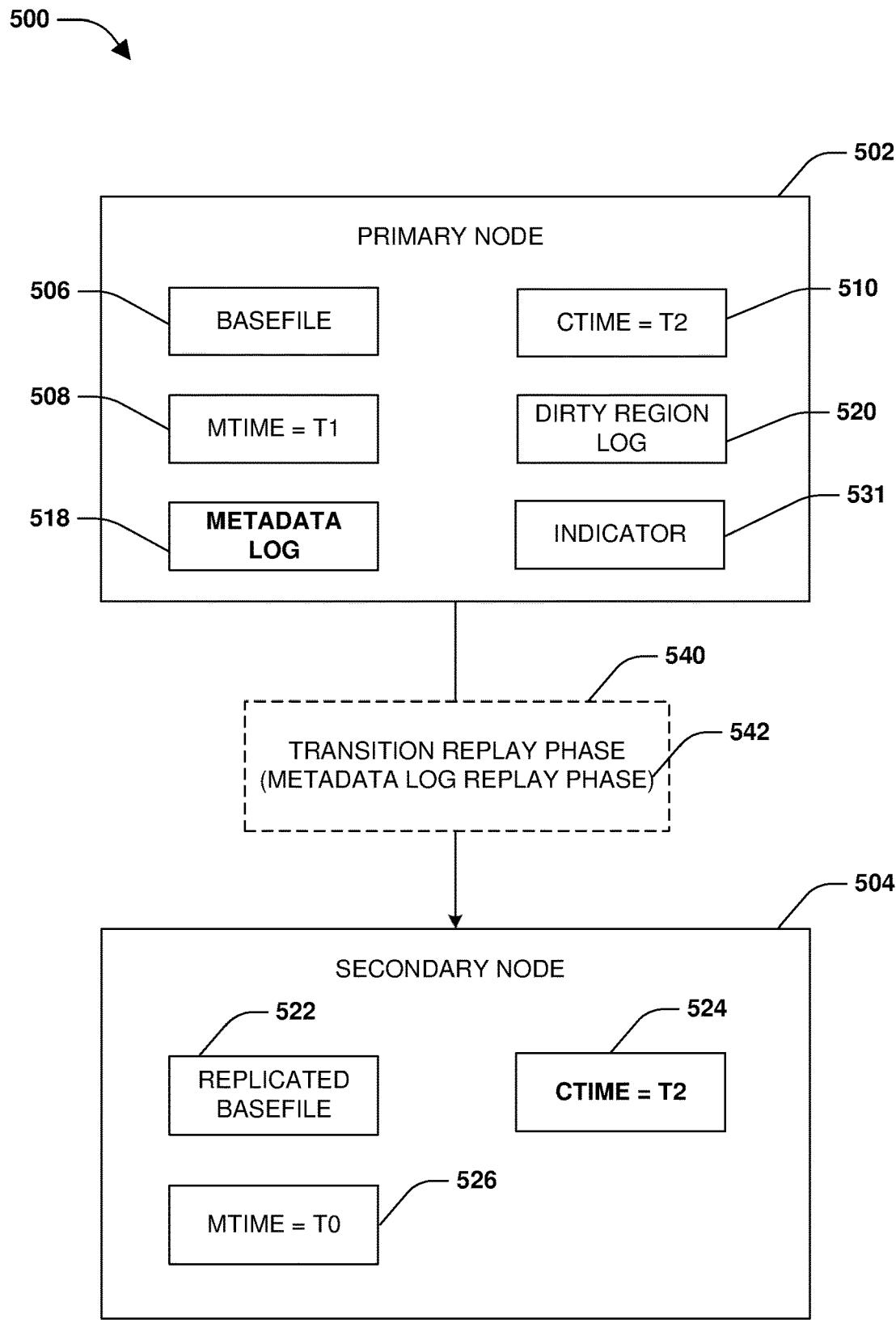
FIG. 5D is a block diagram illustrating an example system for maintaining timestamp parity during a transition replay phase to a synchronous state by utilizing an indicator, where a metadata log replay phase of the transition replay phase is performed.
Figure 5E:
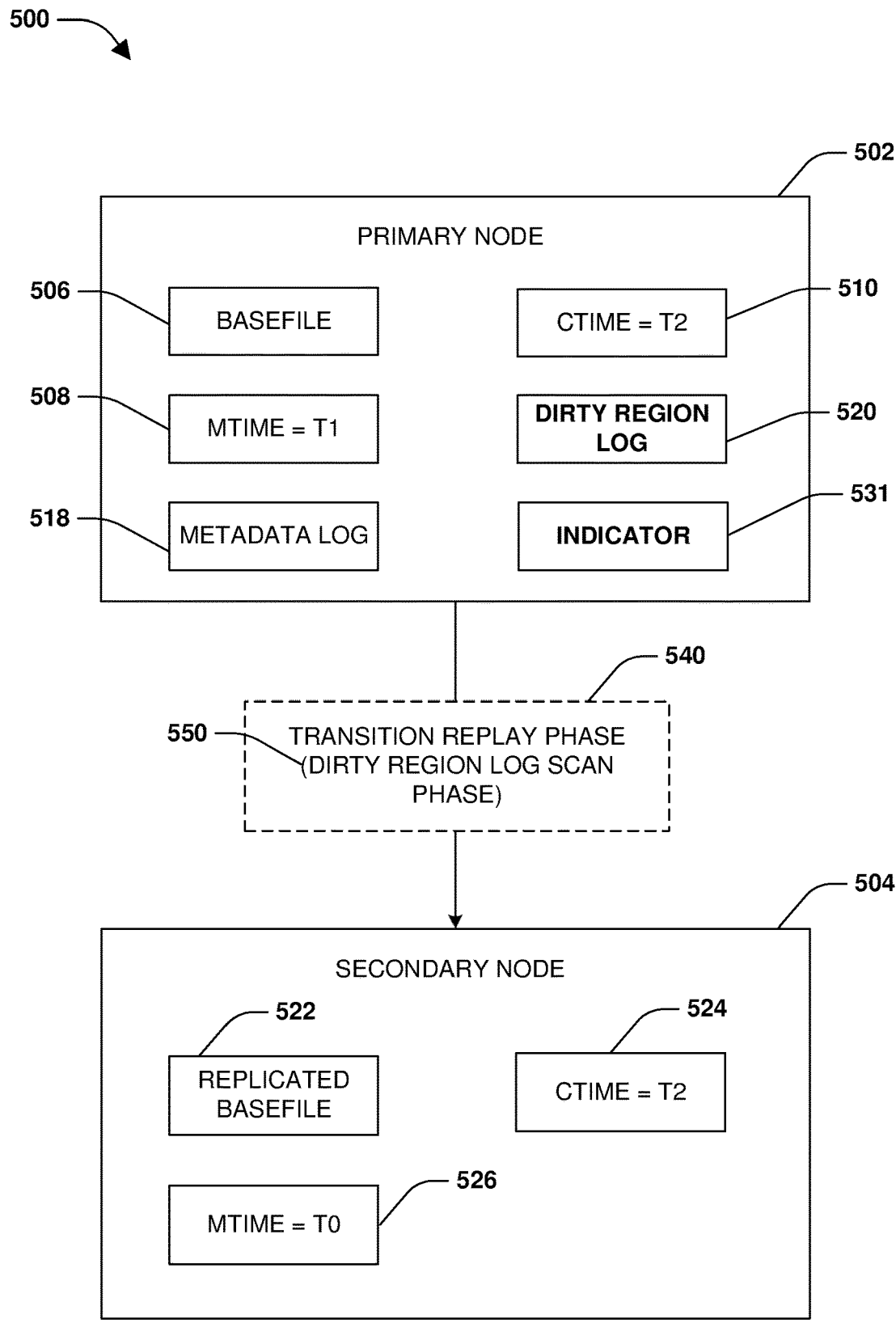
FIG. 5E is a block diagram illustrating an example system for maintaining timestamp parity during a transition replay phase to a synchronous state by utilizing an indicator, where a dirty region log scan phase of the transition replay phase is performed.

As illustrated by FIG. 5D, a transition replay phase 540 may be performed, at 408 (FIG. 4) to transition the primary node 502 and the secondary node 504 from the asynchronous replication state to the in-sync state. During the transition replay phase 540, metadata operations logged within the metadata log 518 are replayed to the secondary node 504 during a metadata log replay phase 542 of the transition replay phase 540. In particular, a cutover scanner may be implemented at the primary node 502 or at any other device or node. The cutover scanner may extract metadata operations from the metadata log 518 and transmit the extracted metadata operations to the secondary node 504 for execution at the secondary node 604. The metadata operations may be extracted, transmitted, and/or executed in an order corresponding to sequence numbers assigned to the metadata operations by the primary node 502 (e.g., sequence numbers are assigned according to an order at which the primary node 502 executed the metadata operations). In this way, the secondary node 504 executes the metadata operations in a same order that the metadata operations were previously executed by the primary node 502. In an example of replaying the metadata operations, the close stream operation 530 is replayed at the secondary node 504, which results in the change timestamp 524 of the replicated basefile 522 being set to the second time t2 at which the close stream operation 530 was executed by the primary node 502. However, the modify timestamp 526 of the replicated basefile 522 remains at t0 since the close stream operation 530 did not change the modify timestamp 508 of the basefile 506 when executed by the primary node 502.

In an embodiment, metadata operations are replayed before dirty data (e.g., data within regions of storage maintained by the primary node 502 having dirty indicators within the dirty region log 520) is replicated to the secondary node 504. Accordingly, once the metadata log replay phase 542 has completed, a dirty region log scan phase 550 of the transition replay phase 540 is performed to replicate data of the regions tracked within the dirty region log 520 as being dirty (e.g., comprising data not yet replicated to the secondary node 504). When a dirty indicator for a region is encountered within the dirty region log 520, data within that region is replicated from the primary node 502 to a corresponding region of storage maintained by the secondary node 504. When a clean indicator for a region is encountered within the dirty region log 520, that region is skipped and no replication is performed because the data within that region is already stored within a corresponding region of storage maintained by the secondary node 504.

Figure 5F:
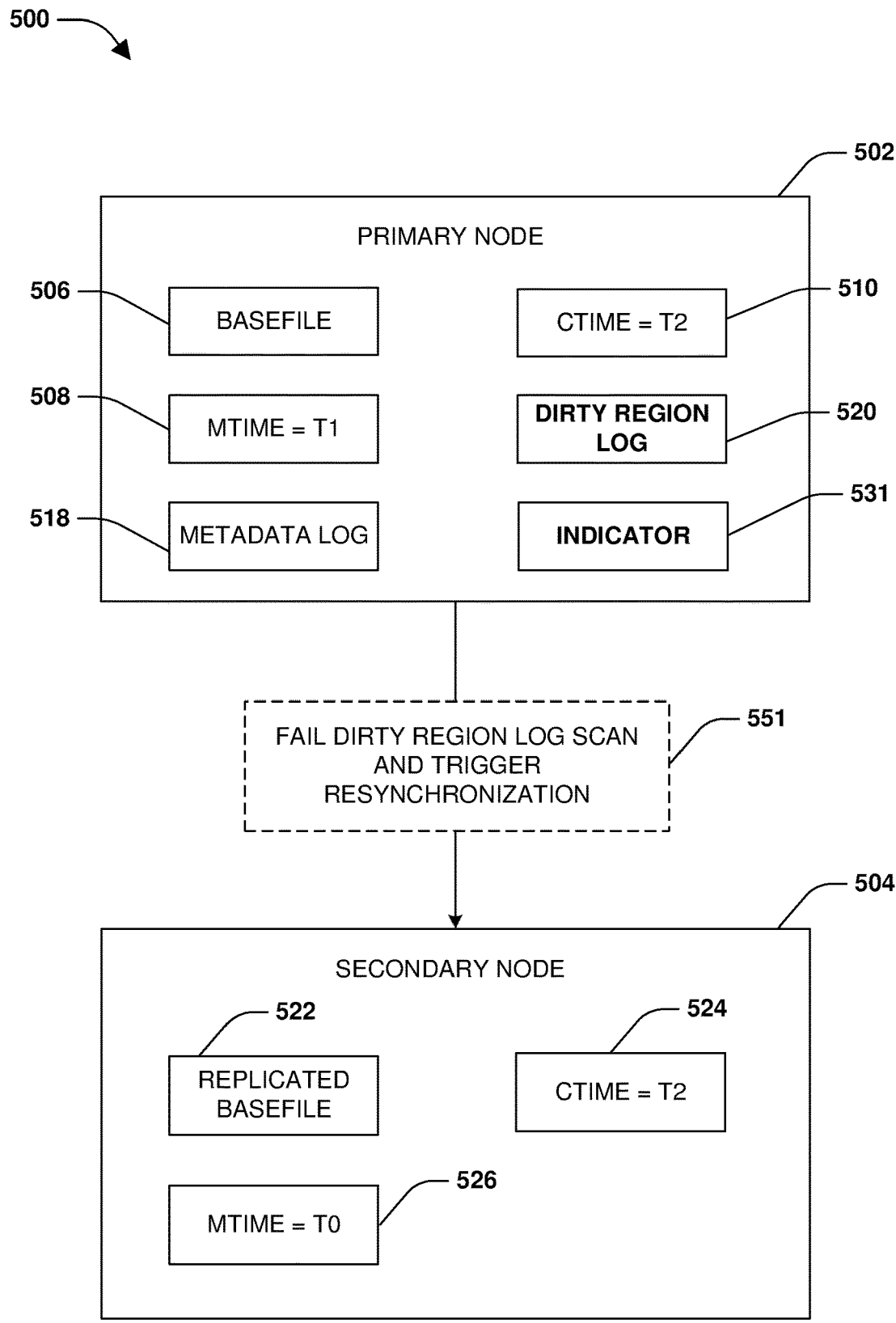
FIG. 5F is a block diagram illustrating an example system for maintaining timestamp parity during a transition replay phase to a synchronous state utilizing an indicator, where a dirty region log scan is failed and a resynchronization is triggered based upon an indicator.
Figure 5G:
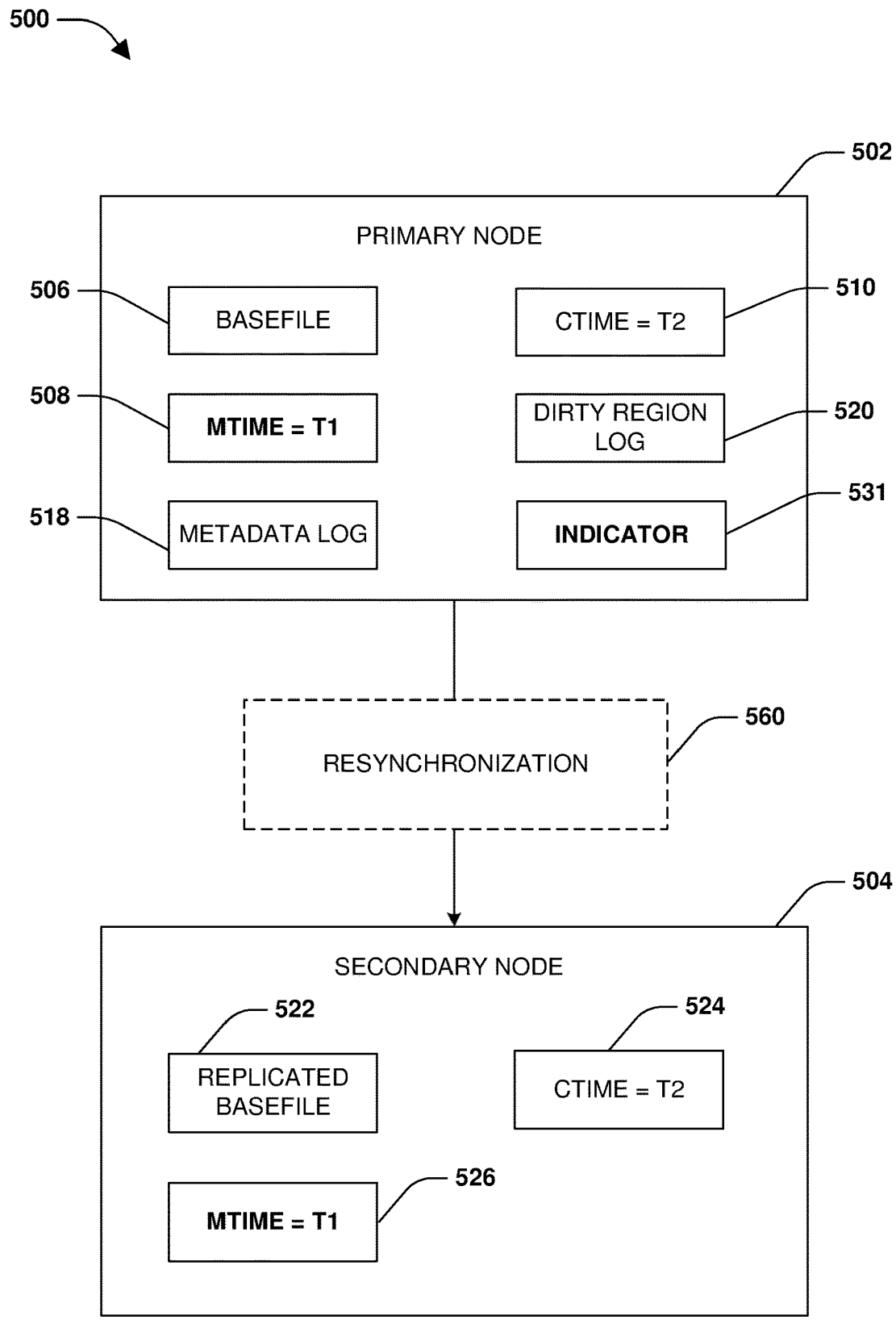
FIG. 5G is a block diagram illustrating an example system for maintaining timestamp parity during a transition replay phase to a synchronous state by utilizing an indicator, where a resynchronization is performed.

As illustrated by FIG. 5F, during the dirty region log scan phase 550, the indicator 531 may be encountered (e.g., the indicator 531 may be encountered within the dirty region log 520 or may be maintained separate from the dirty region log 520, but is also evaluated by the dirty region log scan phase 550). Upon encountering the indicator 531 for the first stream 512, the dirty region log scan is failed 551 to cause a resynchronization 560 to be performed, as illustrated by FIG. 5G. During the resynchronization 560, one or more asynchronous transfers (e.g., asynchronous incremental transfers) are performed to replicate information (e.g., data, metadata, timestamps, etc.) from the primary node 502 to the secondary node 504. Accordingly, the modify timestamp 508 of the first time t1 for the basefile 506 maintained by the primary node 502 will be replicated to the secondary node 504 and applied to the modify timestamp 526 for the replicated basefile 522 to change the value of the replicated basefile 522 from t0 to the first time t1. In an embodiment, the modify timestamp 508 and the change timestamp 510 of a base inode associated with the basefile 506 are replicated to the secondary node 504.

In this way, the indicator 531 is a trigger that results in the identification and replication of data and/or metadata from the primary node 502 to the secondary node 504, such as the modify timestamp 508 of the basefile 506 associated with the first stream 512 identified by indicator 531. In this way, timestamp parity/consistency between the basefile 506 and the replicated basefile 522 is achieved. Because the combination of back to back write data operations and close stream operations to delete streams is not frequent, the resynchronization 560 should successfully complete without encountering further issues. In an embodiment, the dirty region log scan phase 550 (FIG. 5E) may be restarted or resumed after the resynchronization 560 in order to complete the transition replay phase to transition the primary node 502 and the secondary node 504 from being in the asynchronous replication state to being in the in-sync state.

Figure 6:
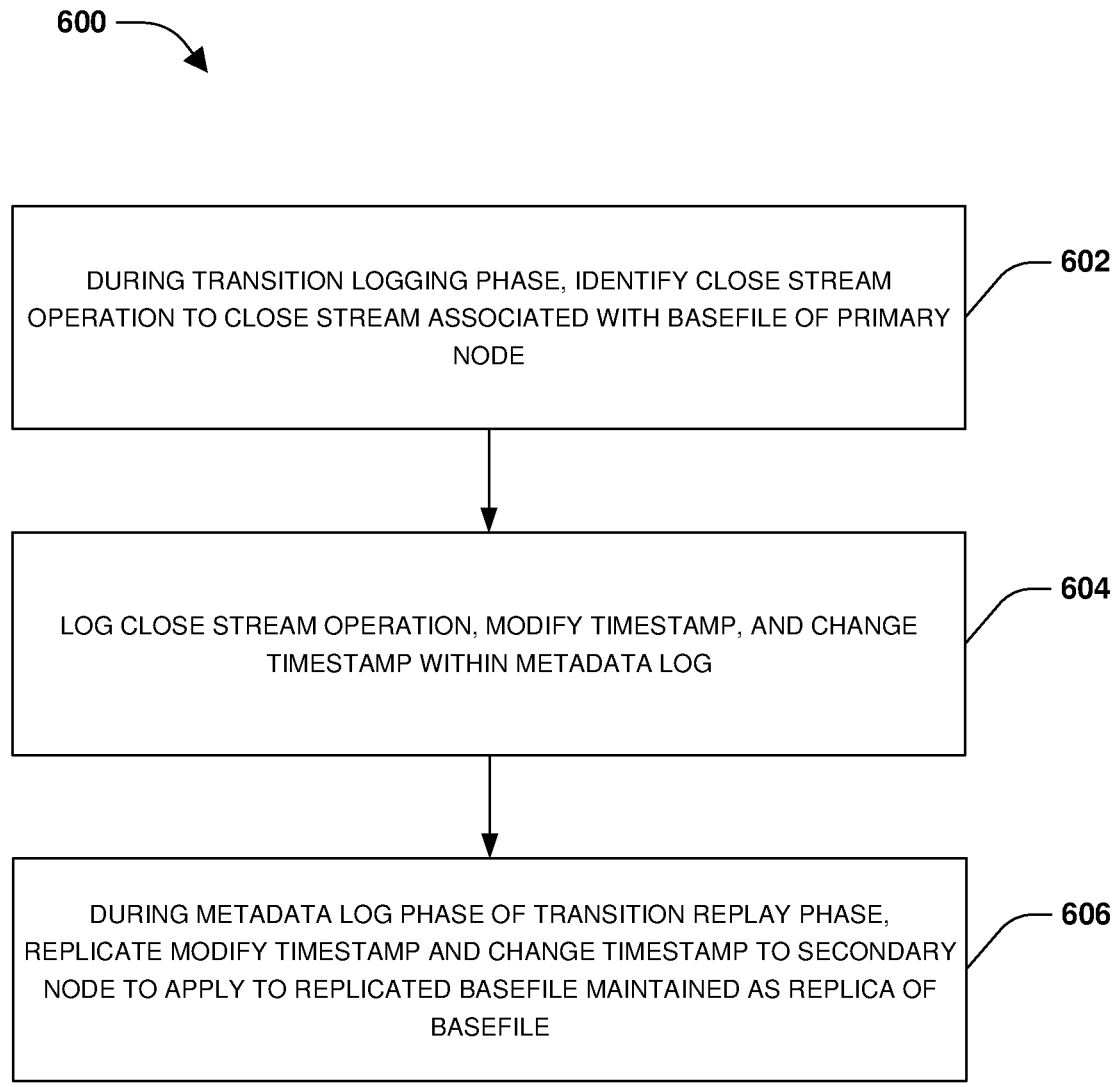
FIG. 6 is a flow chart illustrating an example method for maintaining timestamp parity during a transition replay phase to a synchronous state by logging a modify timestamp and a change timestamp within a metadata log.
Figure 7A:
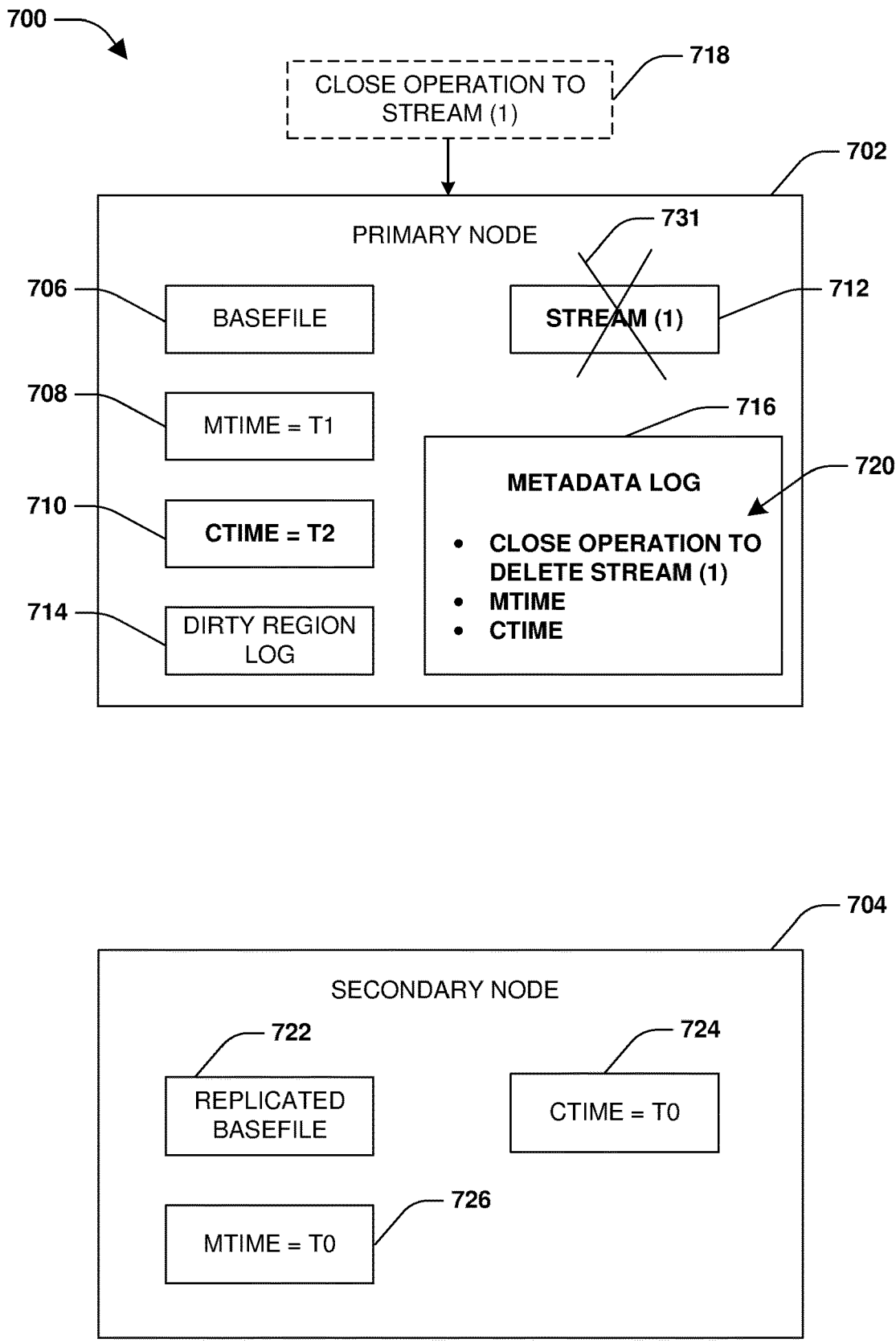
FIG. 7A is a block diagram illustrating an example system for maintaining timestamp parity during a transition replay phase to a synchronous state by logging a modify timestamp and a change timestamp within a metadata log.
Figure 7B:
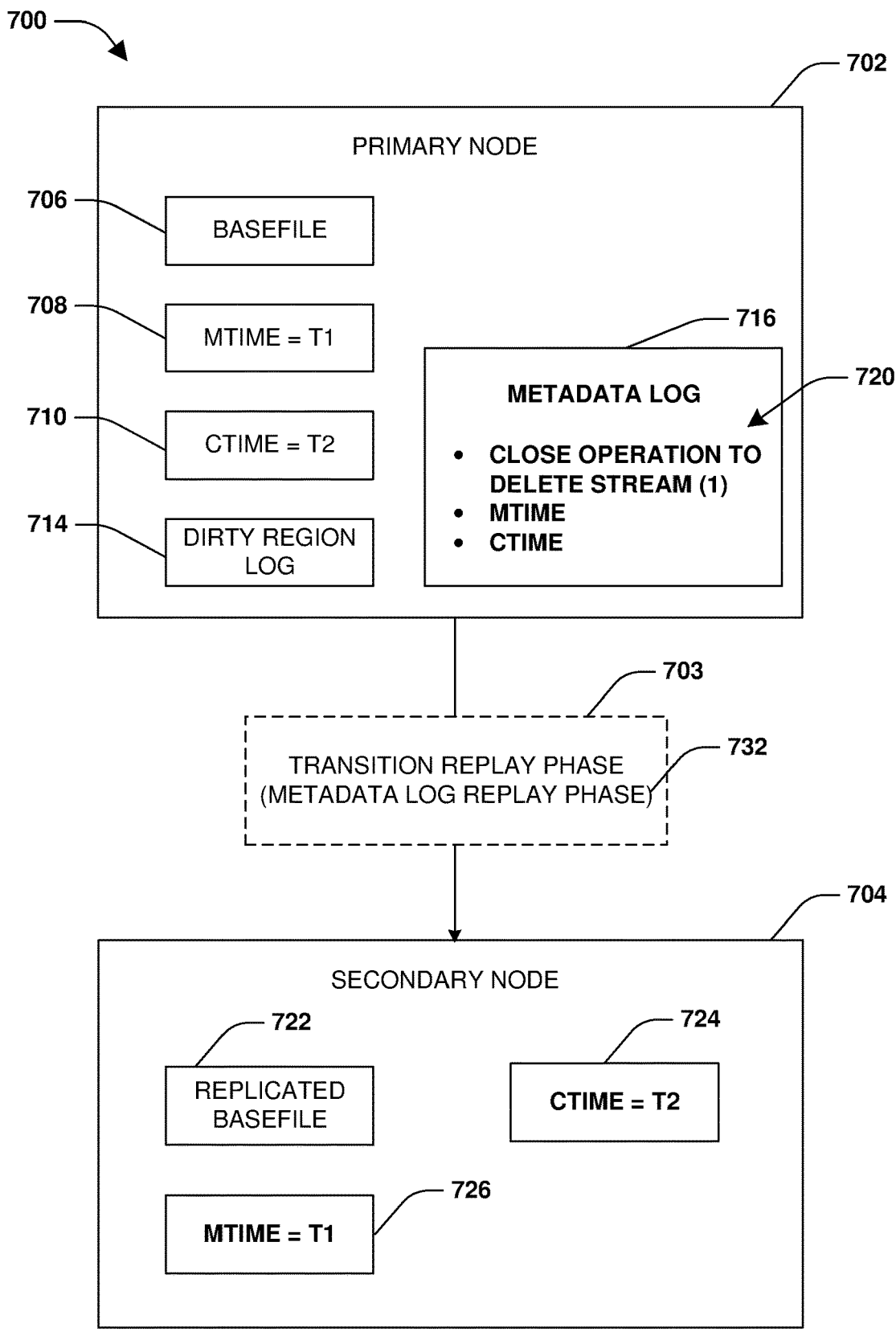
FIG. 7B is a block diagram illustrating an example system for maintaining timestamp parity during a transition replay phase to a synchronous state by replaying and applying a close stream operation, a modify timestamp, and a change timestamp from a metadata log to a secondary node.

One embodiment of maintaining timestamp parity during a transition replay phase to a synchronous state by logging modify timestamps into a metadata log is illustrated by an exemplary method 600 of FIG. 6 and further described in conjunction with system 700 of FIGS. 7A-7B.

A primary node 702 (e.g., a computing device, a server, a virtual machine, hardware, software, cloud computing resources, or any combination thereof) may maintain one or more basefiles that may be accessed by client devices using streams (e.g., an NT stream), as illustrated by FIG. 7A. For example, the primary node 702 may maintain a basefile 706 within which client devices may store and access content through a first stream 712 and/or other streams. In an embodiment, the basefile 706 represents main content of a CIFS file associated with one or more data streams. The basefile 706 may be associated with a modify timestamp 708 corresponding to a last time at which the basefile 706 was written to by an operation. The basefile 706 may be associated with a change timestamp 710 corresponding to a time at which an inode of the basefile 706 was last modified by an operation.

A secondary node 704 may maintain a replicated basefile 722 that is a replica of the basefile 706. The replicated basefile 722 is associated with a modify timestamp 726 and a change timestamp 724. Initially, the modify timestamp 726 and the change timestamp 724 of the replicated basefile 722 have a value of to. In order to maintain consistency between the basefile 706 and the replicated basefile 722, the modify timestamp 726 of the replicated basefile 722 should have the same value as the modify timestamp 708 of the basefile 706 and the change timestamp 724 of the replicated basefile 722 should have the same value as the change timestamp 710 of the basefile 706. Thus, if the primary node 702 fails and the secondary node 704 takes over for the failed primary node 702, the secondary node 704 can provide clients, application, and services with access to the same data and metadata such as timestamp data as what was previously accessible through the primary node 702 before the failure of the primary node 702.

The primary node 702 and the secondary node 704 may be out-of-sync, such as in a non-synchronous replication state (e.g., an asynchronous replication state), such that operations targeting the basefile 706 and/or streams of the basefile 706 are not being synchronously replicated to the replicated basefile 722 before being acknowledged back as being completed. Accordingly, a transition logging phase and a transition replay phase may be performed to bring the primary node 702 and the secondary node 704 into an in-sync state such as a synchronous replication state.

During the transition logging phase, a dirty region log 714 is used to track regions modified by data operations executed by the primary node 702. For example, a write data operation may target the first stream 712 of the basefile 706, such as to write to the first stream 712 which is associated with the basefile 706. Accordingly, a region modified by the write data operation is tracked within the dirty region log 714 using a dirty indicator to indicate that the region was modified with data not yet replicated to a corresponding region within storage of the secondary node 704. The write data operation may be executed by the primary node 702 upon the first stream 712 at a first time t1. Accordingly, the modify timestamp 708 and the change timestamp 710 of the basefile 706 are set to the first time t1.

During the transition logging phase, a metadata log 716 is used to track metadata operations executed by the primary node 702, such as a create operation (e.g., a create file operation, a create LUN operation, a create stream operation, a create basefile operation, etc.), a link operation, an unlink operation, a rename operation (e.g., a file rename operation, etc.), a set attribute operation (e.g., a set volume size operation, an assign permissions operation, etc.), a close operation (e.g., a close stream operation that closes and deletes a stream associated with a basefile), etc. In an embodiment, the primary node 702 receives a close stream operation 718 during the transition logging phase. At 602 (FIG. 6), the close stream operation 718 is identified as a metadata operation to close the first stream 712 associated with the basefile 706 of the primary node 702. The close stream operation 718 is executed by the primary node 702 to close and delete 731 the first stream 712 of the basefile 706 at a second time t2. Accordingly, the change timestamp 710 of the basefile 706 is set to the second time t2 and the modify timestamp 708 remains at the first time t1.

At 604 (FIG. 6), the close stream operation 718 (FIG. 7A), the modify timestamp 708 having the first time t1, and the change timestamp 710 having the second time t2 are logged as entry 720 into the metadata log 716. In an embodiment, the logging of the modify timestamp 708 is triggered based upon a determination that the first stream 712 corresponds to an NT stream of a CIFS file that is deleted by the close stream operation 718. Without triggering the logging the modify timestamp 708 having the first time t1, the modify timestamp 708 would not normally be logged within the metadata log 716 because execution of the close stream operation 718 did not affect the modify timestamp 708.

At 606 (FIG. 6), a transition replay phase 703 (as illustrated by FIG. 7B) is performed where metadata operations tracked within the metadata log 716 are replayed to the secondary node 704 during a metadata log replay phase 732 and data within regions (dirty regions) tracked within the dirty region log 714 are replicated to the secondary node 704 during a dirty region log scan phase performed after the replay of the metadata operations during the metadata log replay phase 732. The transition replay phase 703 is performed to bring the primary node 702 and the secondary node 704 from an asynchronous replication state to an in-sync state, such as a synchronous replication state.

During the metadata log replay phase 732 of the transition replay phase 703, metadata operations logged within the metadata log 716 are replayed at the secondary node 704, along with modify timestamps and change timestamps logged within the metadata log 716 being applied to the secondary node 704. In an embodiment, the close stream operation 718, executed by the primary node 702 and logged within the metadata log 716, is replayed to the secondary node 704. The first time t1 of the modify timestamp 708 logged within the metadata log 716 is applied to the modify timestamp 726 of the replicated basefile 722 so that the modify timestamp 726 of the replicated basefile 722 is set to the first time t1. If the modify timestamp 708 was not logged within the metadata log 716, then the modify timestamp 726 would not be set to the first time t1 at the end of the transition replay phase 703 (e.g., at the end of the dirty region log scan phase because the close stream operation 718 deleted the first stream 712). The second time t2 of the change timestamp 710 logged within the metadata log 716 is applied to the change timestamp 724 of the replicated basefile 722 so that the change timestamp 724 of the replicated basefile 722 is set to the second time t2. In this way, timestamp parity/consistency is maintained between the primary node 702 and the secondary node 704.

Figure 8:
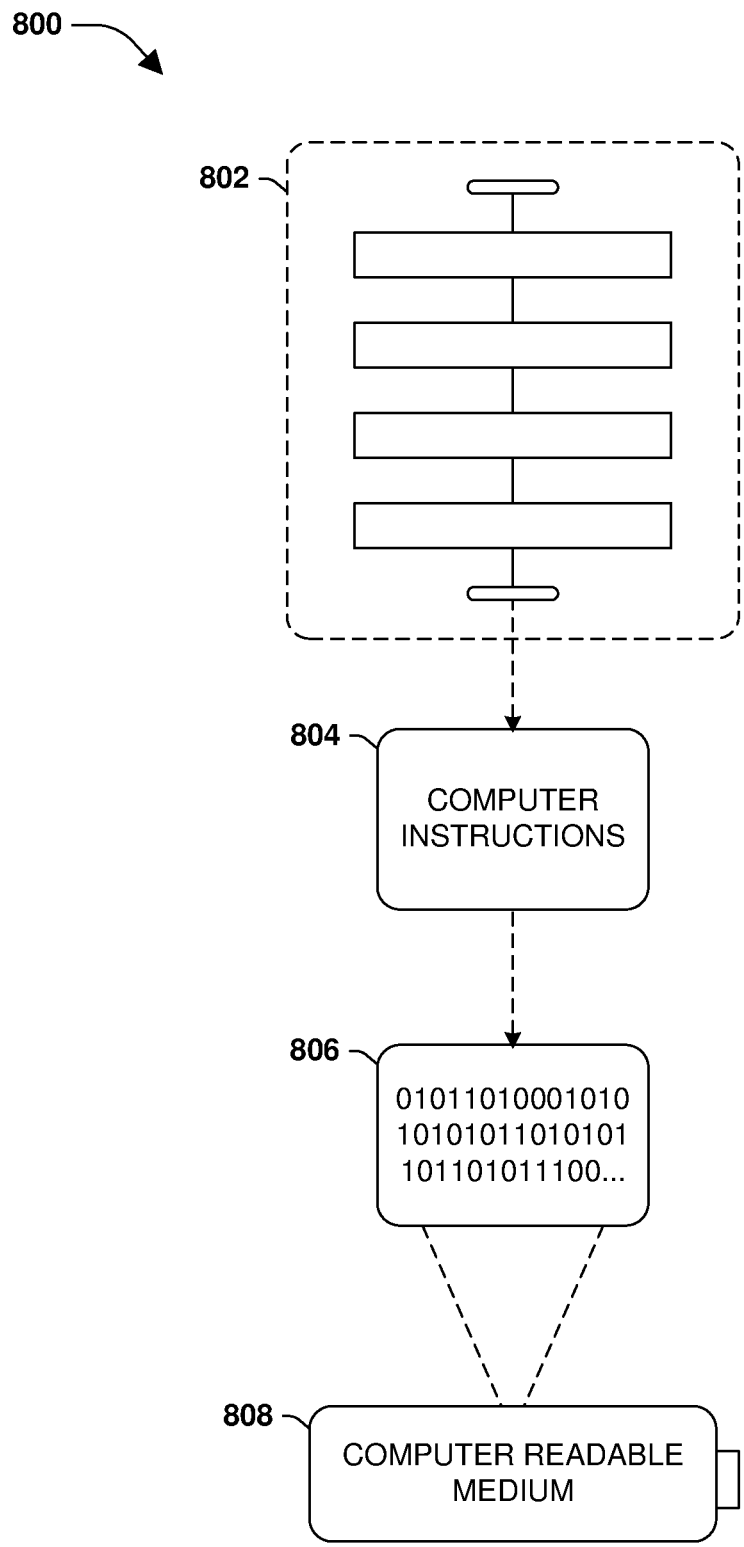
FIG. 8 is an example of a computer readable medium in which an embodiment of the invention may be implemented.

Still another embodiment involves a computer-readable medium 800 comprising processor-executable instructions configured to implement one or more of the techniques presented herein. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform a method 802, such as at least some of the exemplary method 400 of FIG. 4 and/or at least some of the exemplary method 600 of FIG. 6, for example. In some embodiments, the processor-executable computer instructions 804 are configured to implement a system, such as at least some of the exemplary system 500 of FIGS. 5A-5G and/or at least some of the exemplary system 700 of FIGS. 7A-7B, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
creating a stream associated with a basefile of a primary node, wherein the basefile represents main content of a file and the stream corresponds to additional data associated with the basefile, and wherein a modify timestamp of the basefile corresponds to a last time at which the basefile was written and a change timestamp of the basefile corresponds to a time at which an inode of the basefile was last modified;
during a transition logging phase where metadata operations executed by the primary node are logged into a metadata log and regions modified by data operations executed by the primary node are tracked within a dirty region log, identifying a close stream operation that closes and deletes the stream;
in response to detecting that the close stream operation closed and deleted the stream, evaluating the dirty region log to detect whether the dirty region log includes an entry for the stream indicating that a write data operation modified the stream before the close stream operation executed;
in response to detecting that the dirty region log includes the entry, creating a metadata log entry within the metadata log, wherein the metadata log entry includes the close stream operation, the modify timestamp, and the change timestamp; and
during a transition replay phase, reviewing the metadata log and modifying a replicated basefile with the modify timestamp and the change timestamp from the metadata log entry including the closed stream operation.

2. The method of claim 1, comprising:
performing the transition replay phase where the metadata operations tracked within the metadata log are replayed to a secondary node and data of the regions tracked within the dirty region log are replicated to the secondary node to bring the primary node and secondary node from an asynchronous replication state to an in-sync state.

3. The method of claim 2, comprising:
during a metadata log replay phase of the transition replay phase, replicating the modify timestamp of the basefile from the metadata log to the secondary node to apply to the replicated basefile maintained as a replica of the basefile.

4. The method of claim 2, comprising:
during a metadata log replay phase of the transition replay phase, replicating the change timestamp of the basefile from the metadata log to the secondary node to apply to the replicated basefile maintained as a replica of the basefile.

5. The method of claim 1, comprising:
triggering the logging of the modify timestamp and the change timestamp based upon a determination that the close stream operation caused deletion of an NT stream of the basefile.

6. A non-transitory machine readable medium comprising instructions for performing a method, which when executed by a machine, causes the machine to:
create a stream associated with a basefile of a primary node, wherein the basefile represents main content of a file and the stream corresponds to additional data associated with the basefile, and wherein a modify timestamp of the basefile corresponds to a last time at which the basefile was written and a change timestamp of the basefile corresponds to a time at which an inode of the basefile was last modified;
during a transition logging phase where metadata operations executed by the primary node are logged into a metadata log and regions modified by data operations executed by the primary node are tracked within a dirty region log, identify a close stream operation that closes and deletes the stream; and
in response to detecting that the close stream operation closed and deleted the stream, evaluate the dirty region log to detect whether the dirty region log includes an entry for the stream indicating that a write data operation modified the stream before the close stream operation executed;
in response to detecting that the dirty region log includes the entry, create a metadata log entry within the metadata log, wherein the metadata log entry includes the close stream operation, the modify timestamp, and the change timestamp; and
during a transition replay phase, reviewing the metadata log and modifying a replicated basefile with the modify timestamp and the change timestamp from the metadata log entry including the closed stream operation.

7. The non-transitory machine readable medium of claim 6, wherein the instructions cause the machine to:
perform the transition replay phase where the metadata operations tracked within the metadata log are replayed to a secondary node and data of the regions tracked within the dirty region log are replicated to the secondary node to bring the primary node and secondary node from an asynchronous replication state to an in-sync state.

8. The non-transitory machine readable medium of claim 7, wherein the instructions cause the machine to:
during a metadata log replay phase of the transition replay phase, replicate the modify timestamp of the basefile from the metadata log to the secondary node to apply to the replicated basefile maintained as a replica of the basefile.

9. The non-transitory machine readable medium of claim 7, wherein the instructions cause the machine to:
during a metadata log replay phase of the transition replay phase, replicate the change timestamp of the basefile from the metadata log to the secondary node to apply to the replicated basefile maintained as a replica of the basefile.

10. The non-transitory machine readable medium of claim 6, wherein the instructions cause the machine to:
triggering the logging of the modify timestamp and the change timestamp based upon a determination that the close stream operation caused deletion of an NT stream of the basefile.

11. The non-transitory machine readable medium of claim 6, wherein the modify timestamp corresponds to a last modified time of the basefile.

12. The non-transitory machine readable medium of claim 6,
wherein an indicator is set based upon the close stream operation closing and deleting the stream.

13. A computing device comprising:
a memory comprising machine executable code for performing a method; and
a processor coupled to the memory, the processor configured to execute the machine executable code to cause the processor to:
create a stream associated with a basefile of a primary node, wherein the basefile represents main content of a file and the stream corresponds to additional data associated with the basefile, and wherein a modify timestamp of the basefile corresponds to a last time at which the basefile was written and a change timestamp of the basefile;
during a transition logging phase where metadata operations executed by the primary node are logged into a metadata log and regions modified by data operations executed by the primary node are tracked within a dirty region log, identify a close stream operation that closes and deletes the stream;
in response to detecting that the close stream operation closed and deleted the stream, evaluate the dirty region log to detect whether the dirty region log includes an entry for the stream indicating that a write data operation modified the stream before the close stream operation executed;
in response to detecting that the dirty region log includes the entry, create a metadata log entry within the metadata log, wherein the metadata log entry includes the close stream operation, the modify timestamp, and the change timestamp; and
during a transition replay phase, reviewing the metadata log and modifying a replicated basefile with the modify timestamp and the change timestamp from the metadata log entry including the closed stream operation.

14. The computing device of claim 13, wherein the metadata operations are replayed during the transition replay phase before data, tracked within the dirty region log, is replicated to a secondary node.

15. The computing device of claim 13, wherein the machine executable code causes the processor to:
performing the transition replay phase where the metadata operations tracked within the metadata log are replayed to a secondary node and data of the regions tracked within the dirty region log are replicated to the secondary node to bring the primary node and secondary node from an asynchronous replication state to an in-sync state.

16. The computing device of claim 15, wherein the modify timestamp corresponds to a last modified time of the basefile.

17. The computing device of claim 15, wherein an indicator is set based upon the close stream operation closing and deleting the stream.

18. The computing device of claim 13, wherein the machine executable code causes the processor to:
in response to the dirty region log comprising no entries corresponding to the stream, refrain from setting an indicator that the stream was closed and deleted by the close stream operation.

19. The computing device of claim 13, wherein an indicator is set based upon the close stream operation closing and deleting the stream, wherein the indicator comprises a flag indicating that an entry within the dirty region log is for an NT stream that was deleted.

20. The computing device of claim 13, wherein an indicator is set based upon the close stream operation closing and deleting the stream, wherein the indicator comprises a flag indicating that an entry within the dirty region log is for a stream that was deleted.

* * * * *